US005597913A

United States Patent [19]

Nicoletti et al.

[11] Patent Number: 5,597,913

[45] Date of Patent: Jan. 28, 1997

[54] GLYCOGEN POLYSACCHARIDES

[75] Inventors: Rosario Nicoletti; Leandro Baiocchi, both of Rome, Italy

[73] Assignee: Istituto Ricerca Francesco Angelini S.p.A., Rome, Italy

[21] Appl. No.: 373,266

[22] Filed: Jan. 26, 1995

[30] Foreign Application Priority Data

Aug. 4, 1992 [IT] Italy ................................ MI91A1927

[51] Int. Cl.[6] .............................. C07H 1/00; C07G 17/00

[52] U.S. Cl. ....................... 536/123.1; 536/124; 536/127; 536/1.11; 424/553

[58] Field of Search ................................ 536/123.1, 124, 536/127, 1.11; 426/656, 657; 424/553

[56] References Cited

U.S. PATENT DOCUMENTS

| | | | |
|---|---|---|---|
| 3,592,168 | 5/1969 | Claus | 536/123.1 |
| 4,343,784 | 8/1992 | Massot et al. | 424/553 |
| 4,968,523 | 11/1990 | Usui et al. | 426/656 |

OTHER PUBLICATIONS

M. Somogyi, J. Biol. Chem., 104, 245, 1934.

Snell and Snell, Colorimetric Methods of Analysis NY, vol. III, p. 204, 1954.

Kjeldahl Meth, 1953.

*Primary Examiner*—Gary E. Hollinden
*Assistant Examiner*—Louise N. Leary
*Attorney, Agent, or Firm*—Oblon, Spivak, McClelland, Maier & Neustadt, P.C.

[57] ABSTRACT

Glycogen polysaccharides substantially free of nitrogenous compounds and reducing sugars.

7 Claims, No Drawings

GLYCOGEN POLYSACCHARIDES

This invention relates to glycogen polysaccharides, the process for their preparation and their use. More particularly, this invention relates to glycogen polysaccharides substantially free of nitrogenous compounds and reducing sugars.

The term "glycogen" is commonly used to mean a group of similar, but not identical, proteoglycans widespread in the animal kingdom.

The most investigated glycogen is the one extracted from rabbit liver and it is believed to be a protein (glycogenin) having a molecular weight of about 37,000 daltons, linked by a glycosidic link of a tyrosine to a highly branched polysaccharide of glucose having a molecular weight of 10,000,000 daltons (beta particle). Many beta particles, up to 50, can aggregate together to yield a compound (alpha particles) having a molecular weight of 500,000,000 daltons, which is the unit of native glycogen (D. J. Manners, Carbohydrate Polymers, 16, pp 37–82 (1991)).

The various glycogens of the different animal species show, as far as is known, differences in the degree of the polysaccharide branching. Thus, for example, Stuart A. S. Craig et al. (Carbohydrate Research 179, pp 327–340 (1988)) reported significant differences in the polysaccharide branching of glycogen samples extracted from mammals and invertebrates. Indeed, although several different processes for the extraction of glycogen from animal tissues are described in the literature, they mainly have two different aims:

(i) a quantitative extraction of glycogen with an analytical scope for biochemistry; that is, an extraction aimed at the subsequent quantitative determination of the level of glycogen in a certain tissue;

(ii) the extraction of glycogen samples, minimizing the denaturation of the original polymer, for subsequent biochemical and conformational studies.

As a consequence, irrespective of their origin, in all the types of glycogen commercially available there is always some amount of nitrogen (500–600 ppm), which corresponds to at least that calculated for proteoglycan (D. J. Manners et al., as cited above).

From an examination of the literature, a notable difference is found between the points of view of the various authors, some of whom consider the said amount of nitrogen as a trace impurity, and others who consider it a minor constituent of glycogen. On the other hand, the various commercial sources do not specify any difference between proteoglycan glycogen and its polysaccharide.

While the extraction of glycogen has been thoroughly investigated, poor attention has been devoted to the extraction of glycogen polysaccharide so far. Only an old paper describes a method for the preparation of glycogen samples "free of nitrogen" from rat livers (M. Somogyi, J. Biol. Chem., 104, 245 (1934)). However, it should be noted that in this preparation glycogen undergoes an acid treatment for one night, that is in hydrolysing conditions for the glycogen polysaccharide. Moreover, the sensitivity of the analytical method used by the authors to test the nitrogen content is not known.

When we attempted to practise the said method it was found to be poorly reproducible and the product obtained had a small, but variable, quantity of nitrogen and/or a noticeable quantity of reducing sugars (more than 0.15%) as a consequence of hydrolytic degradation.

Various pharmaceutical uses have been proposed for glycogen, especially as an emollient (JP-A-87-178 505) and as an excipient for its hydrating properties (JP-A-88-290 809) and in dermatological products against the skin ageing (U.S. Pat. No. 5 093 109).

Moreover, it has been proposed to use it as a nutrient medium for bacilli which produce lactic acid, in a pharmaceutical form to regulate vaginal pH (EP-A-0 257 007). However, it is not enough stable and it is likely that traces of proteins, nucleic acids and fragments thereof give rise to sensitivity phenomena. Living contaminants could be even present.

Therefore, we aimed at the preparation of a compound which maintains for the most part the structure of glycogen polysaccharide and also ensures the maximum innocuity and safety. That is to say, a compound which is free of nitrogenous compounds and reducing sugars.

After many fruitless attempts, it was unexpectedly found that an aqueous solution of crude glycogen treated for a sufficiently long time with a cationic resin leaves in solution the desired polysaccharide. The polysaccharide can then be easily precipitated by adding a solvent miscibile in water.

Thus, the first object of this invention is to provide a glycogen polysaccharide substantially free of nitrogenous compounds and reducing sugars.

As used in this specification and in the claims appended thereto, the expression "substantially free of nitrogenous compounds and reducing sugars" is intended to mean that the of nitrogen content is less than 60 ppm as measured by the Kjeldahl method and the reducing sugars content is less than 0.25% as measured by the method of F.D. Snell and Snell, "Colorimetric Methods of Analysis New York, 1954, vol. III, p 204).

*Mytilus edulis* and *Mytilus gallus provincialis* are a particularly interesting source of glycogen; in fact, these molluscs are found in large quantities at a moderately low cost and have a fairly high glycogen content. Thus, the preferred glycogen polysaccharide according to this invention is that obtained from *Mytilus Edulis* and *Mytilus gallus provincialis*.

However, this invention is not limited to glycogen polysaccharide from *Mytilus edulis* and *Mytilus gallus provincialis*. Other suitable sources of glycogen for preparing the corresponding polysaccharide according to this invention include other molluscs, such as oysters and *Credipula fornicata*, or the organs of animal vertebrates rich in glycogen, such as the liver and muscle.

The glycogen polysaccharide of this invention is further characterized by a carbon content of from about 44 to about 45%, a molecular weight of about $(2.5\pm0.1)\times10^6$ daltons and a rotatory power $(\text{alfa})_D^{20}$ of $197\pm2.0$ (c=1 in water).

The first step in the method to prepare the glycogen polysaccharide of this invention is performed according to conventional techniques which comprise boiling the selected tissues in an aqueous solution of a strong base, cooling the broth thus obtained and then precipitating the glycogen by adding a non-acidic, volatile solvent, miscible in water.

As is already well known, the quantity of glycogen contained in the various tissues ranges widely, not only with regards to the tissue and the animal species but also, for the same animal tissue of the same species, with regards to various other factors such as the nutritional state and the time of the year.

Thus, the quantity of glycogen extracted according to the abovementioned treatment depends largely on the quantity contained in the treated animal tissues.

The novel step of the process of this invention lies in adjusting to neutral the pH of the solution obtained by dissolving the said precipitate in water and then treating the solution with a cationic resin.

Thus, a further object of this invention is to provide a process for preparing a glycogen polysaccharide substantially free of nitrogenous compounds and reducing sugars comprising boiling an animal tissue rich in glycogen in an aqueous solution of a strong base, cooling the broth thus obtained, adding a non-acidic, volatile solvent miscible in water, separating the precipitate formed by filtration and dissolving the said precipitate in water, characterized in that the pH of the aqueous solution of the precipitate is adjusted to neutral and treated with a cationic resin, filtered to separate the cationic resin, treated with a non-acidic, volatile solvent miscible in water to precipitate the polysaccharide free of nitrogenous compounds and reducing sugars and filtered to recover the precipitate formed.

The neutralization step is preferably performed with a weak organic acid, soluble in water such as acetic acid.

The treatment with a cationic resin is preferably carried out for from 8 to 48 hours under stirring and at room temperature.

An example of a suitable cationic resin is Amberlite™ IR-120 in acid form; other cationic resins having similar properties may also be used.

The cationic resin is then separated by filtration and a solvent miscible in water is added.

Examples of preferred solvents are the lower alcohols and ketons such as ethyl alcohol and acetone.

A precipitate is thus formed, which is the glycogen polysaccharide free of nitrogenous compounds and reducing sugars and is separated by filtration. No further purification is needed apart from the removal of the solvent.

The yield, with respect to the glycogen precipitated from the broth, is approximately quantitative.

Thereby, one of the further advantages of the process of this invention is that the production cost for the polysaccharide of the invention is substantially the same as the extraction cost for glycogen. In other words, for substantially the same cost, this invention yields a product which can substitute glycogen in all its known uses without having the drawbacks of containing proteins, nucleic acids or their fragments and/or reducing sugars.

The following examples are intended to illustrate this invention without, however, limiting it in any way.

EXAMPLE 1

A) Extraction of glycogen 1000 g of *Mytilus gallus provincialis* pulp were placed in a steel vessel with 1.0 l of 30% KOH and heated to 100° C. for 1 hour.

The solution thus obtained was cooled to room temperature and 1.5 l of 95% ethyl alcohol added. The solid precipitate formed (62 g) was separated by filtration.

After drying, this product had the following characteristics

C: 44.44%

N: 0.18–0.34%

B) Preparation of the glycogen polysaccharide

The solid separated in Step A was dissolved in 1 L of water, the pH of the resulting solution was adjusted to neutral with glacial acetic acid and then filtered to complete limpidity.

To the solution thus obtained 60 g of Amberlite™ IR-120, in acid form, were added and the mixture was maintained under stirring at room temperature for 24 hours.

The resin was separated from the solution by filtration and the glycogen polysaccharide was precipitated by adding an equal volume of 95% ethyl alcohol and then separated by filtration. After drying, the glycogen polysaccharide thus prepared (61 g) exhibited the following physico-chemical characteristics;

C: 44.44%

N: absent* reducing sugars: absent** molecular weight: $(2.5\pm0.1)\times10^{6}$***

$(\text{alpha})_D^{20}$: 198 ±1.0 (c=1 in water)

Hydrolysis with 1N $H_2SO_4$ (3 hours at 100° C.) yields only glucose (tested by gas chromatography according to M. Ochiai, J. Crom. 194, 224 (1980)).

(tested according to F.D. Snell and Snell, Colorimetric Methods of Analysis New York, 1954, vol. III, p 204, sensitivity of method 0.25%)

sensitivity of method 60 ppm (calculated from the value of (eta) by applying the Flory equation with the following values $k=1.80\times10^{-4}$, a=0.70, obtained by L. P. Yu and J. E. Rolling for glycogen (J. Applied Pol. Sci. 33, 1909 (1987)).

EXAMPLE 2

The glycogen polysaccharide from *Mytilus gallus provincialis* was prepared as described in part B of Example 1 except that the precipitation step was performed with acetone instead of ethyl alcohol.

Yield, 60.5 g;

$(\text{alpha})_D^{20}$: 196±1.0 (c=1 in water);

Reducing sugars: absent.

EXAMPLE 3

5 g of glycogen from pig liver extracted according to Bell et al. "Biochem. J. 28, 882 (1934)" were dissolved in water (85 ml), treated with Amberlite™ IR-120 (5 g) and then precipitated with 95% ethyl alcohol (85 ml) as described in part B of Example 1.

Nitrogen and reducing sugars were absent; the rotatory power was similar to that of the glycogen polysaccharides of the Examples 1 and 2.

We claim:

1. A process for preparing a glycogen polysaccharide having a nitrogen content of less than 60 ppm when measured by the Kjeldahl method and reducing sugars content of less than 0.25% when measured by the method of F.D. Snell and Snell, comprising:

boiling an animal tissue rich in glycogen in an aqueous solution of a strong base, cooling the broth thus obtained, adding a non-acidic, volatile solvent miscible in water to promote formation of a precipitate, separating the precipitate and dissolving said precipitate in water to form an aqueous solution, adjusting the pH of said aqueous solution to neutral and treating the solution with a cationic resin, separating the cationic resin from the solution and adding a non-acidic, volatile solvent miscible in water to precipitate a polysaccharide free of nitrogenous compounds and reducing sugars, then recovering the precipitate formed.

2. A process according to claim 1, wherein the neutralization step is performed with a weak organic acid.

3. A process according to claim 1, wherein the treatment with a cationic resin is carried out at room temperature.

4. A process according to claim 1, wherein the treatment with a cationic resin is carried out for from 8 to 48 hours.

5. A process according to claim 4, characterized in that the treatment with a cationic resin is carried out for 24 hours.

6. A process according to claims 1, 2, 3, 4, or 5, wherein the cationic resin is Amberlite™ IR-120 in acid form.

7. A process according to claim 1, wherein the solvent is ethyl alcohol or acetone.

* * * * *

UNITED STATES PATENT AND TRADEMARK OFFICE

CERTIFICATE OF CORRECTION

PATENT NO. : 5,597,913

DATED : January 28, 1997

INVENTOR(S) : Rosario NICOLETTI, et al.

It is certified that error appears in the above-indentified patent and that said Letters Patent is hereby corrected as shown below:

On the title page, Item [30], the Foreign Application Priority Data should read:

--Aug. 4, 1992 [IT] Italy.....MI92A1927--

On the title page, the PCT information is missing. It should read:

--[22] PCT Filed: Jul. 28, 1993

[86] PCT No.: PCT/EP93/02006
§ 371 Date: Jan. 26, 1995
§ 102 (e) Date: Jan. 26, 1995

[87] PCT Pub. No.: WO94/03502
PCT Pub. Date: Feb. 17, 1994--

Signed and Sealed this

Twentieth Day of May, 1997

Attest:

BRUCE LEHMAN

*Attesting Officer*

*Commissioner of Patents and Trademarks*